(12) United States Patent
Golov

(10) Patent No.: US 11,704,204 B2
(45) Date of Patent: *Jul. 18, 2023

(54) HIGH-RELIABILITY NON-VOLATILE MEMORY USING A VOTING MECHANISM

(71) Applicant: Micron Technology, Inc., Boise, ID (US)

(72) Inventor: Gil Golov, Backnang (DE)

(73) Assignee: Micron Technology, Inc., Boise, ID (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/155,641

(22) Filed: Jan. 22, 2021

(65) Prior Publication Data

US 2021/0141699 A1 May 13, 2021

Related U.S. Application Data

(63) Continuation of application No. 16/189,697, filed on Nov. 13, 2018, now Pat. No. 10,901,862.

(51) Int. Cl.
*G06F 11/18* (2006.01)
*G06F 12/0864* (2016.01)
(Continued)

(52) U.S. Cl.
CPC ........ *G06F 11/183* (2013.01); *G06F 11/1004* (2013.01); *G06F 11/187* (2013.01);
(Continued)

(58) Field of Classification Search
None
See application file for complete search history.

(56) References Cited

U.S. PATENT DOCUMENTS 6,108,598 A 8/2000 Sumitani
7,509,567 B1 * 3/2009 Kiselev ................ G06F 11/183
714/797
(Continued)

OTHER PUBLICATIONS

International Search Report and Written Opinion, Int. App. No. PCT/US2018/052634, dated Jan. 20, 2019.
(Continued)

*Primary Examiner* — April Y Blair
*Assistant Examiner* — Matthew W Wahlin
(74) *Attorney, Agent, or Firm* — Greenberg Traurig

(57) ABSTRACT

A memory system includes a processing device (e.g., a controller implemented using a CPU, FPGA, and/or logic circuitry) and memory regions (e.g., in a flash memory or other non-volatile memory) storing data. The processing device receives an access request from a host system that is requesting to read the stored data. In one approach, the memory system is configured to: receive, from the host system over a bus, a read command to access data associated with an address in a non-volatile memory; in response to receiving the read command, access, by the processing device, multiple copies of data stored in at least one memory region of the non-volatile memory; match, by the processing device, data from the copies with each other; select, based on matching data from the copies with each other, first data from a first copy of the copies; and provide, to the host system over the bus, the first data as output data.

19 Claims, 7 Drawing Sheets

(51) Int. Cl.
   *G06F 12/02* (2006.01)
   *G06F 11/10* (2006.01)

(52) U.S. Cl.
   CPC ...... *G06F 12/0246* (2013.01); *G06F 12/0864* (2013.01); *G06F 2212/7201* (2013.01)

(56) References Cited

U.S. PATENT DOCUMENTS

| | | | |
|---|---|---|---|
| 8,145,822 | B2 | 3/2012 | Hachmann et al. |
| 8,601,321 | B2 | 12/2013 | Feng |
| 8,751,860 | B2* | 6/2014 | Feeley ............... G06F 11/1068 714/6.21 |
| 9,110,832 | B2* | 8/2015 | Feeley ............... G06F 12/0246 |
| 9,331,989 | B2 | 5/2016 | Dover |
| 9,502,128 | B2 | 11/2016 | Lee |
| 9,533,579 | B2 | 1/2017 | Nomura |
| 9,569,622 | B2 | 2/2017 | Dover |
| 9,613,214 | B2 | 4/2017 | Dover |
| 10,431,299 | B2 | 10/2019 | Tokutomi et al. |
| 10,836,402 | B2 | 11/2020 | Golov |
| 10,901,862 | B2 | 1/2021 | Golov |
| 2009/0210777 | A1 | 8/2009 | Weiberle et al. |
| 2014/0208151 | A1 | 7/2014 | Fernandez |
| 2015/0094899 | A1 | 4/2015 | Hackenberg et al. |
| 2015/0280919 | A1 | 10/2015 | Cullen et al. |
| 2015/0331055 | A1 | 11/2015 | Oi et al. |
| 2017/0024127 | A1* | 1/2017 | Bazarsky ............. G06F 3/0679 |
| 2017/0075352 | A1 | 3/2017 | Nordbruch |
| 2017/0300052 | A1 | 10/2017 | Harda et al. |
| 2018/0039538 | A1* | 2/2018 | Freikorn ............. G06F 11/1048 |
| 2019/0163367 | A1 | 5/2019 | Bazarsky et al. |
| 2019/0193745 | A1 | 6/2019 | Golov |
| 2019/0193746 | A1 | 6/2019 | Golov |
| 2019/0193747 | A1 | 6/2019 | Golov |
| 2020/0151067 | A1 | 5/2020 | Golov |
| 2021/0141699 | A1* | 5/2021 | Golov ................ G06F 11/1004 |

OTHER PUBLICATIONS

P. Balasubramanian et al., "A Fault Tolerance Improved Majority Voter for TMR System Architectures", WSEAS Transactions on Circuits and Systems, vol. 15, 2016, pp. 108-122.

Raid, https://en.wikipedia.org/wiki/RAID, printed on Oct. 25, 2018, 11 pages.

Sandeep Kaushik, Yervant Zorian, "Embedded memory test and repair optimizes SoC yields", Jul. 17, 2012.

* cited by examiner

HIGH-RELIABILITY NON-VOLATILE MEMORY USING A VOTING MECHANISM

RELATED APPLICATIONS

The present application is a continuation application of U.S. patent application Ser. No. 16/189,697, filed Nov. 13, 2018, issued as U.S. Pat. No. 10,901,862 on Jan. 26, 2021, and entitled "HIGH-RELIABILITY NON-VOLATILE MEMORY USING A VOTING MECHANISM," the disclosure of which application is hereby incorporated by reference herein in its entirety.

This application is related to U.S. Non-Provisional application Ser. No. 15/855,734, filed Dec. 27, 2017, entitled "Determination of Reliability of Vehicle Control Commands using a Voting Mechanism," by Gil Golov, the entire contents of which application is incorporated by reference as if fully set forth herein.

FIELD OF THE TECHNOLOGY

At least some embodiments disclosed herein relate to memory systems in general, and more particularly, to accessing data stored in a non-volatile memory.

BACKGROUND

Various error-detection and correction approaches are used in computing systems. In some cases, error-detection and correction schemes are used to add redundancy to a message. Recipients of the message can use the schemes to check consistency of the delivered message, and to recover data that has been determined to be corrupted.

In one example, error-detection and correction schemes are either systematic or non-systematic. In a systematic scheme, a transmitter sends the original data, and attaches a fixed number of check bits (or parity data), which are derived from the data bits by a deterministic algorithm. If only error detection is required, a receiver can apply the same algorithm to the received data bits and compare its output with the received check bits. If the values do not match, an error has occurred at some point during the transmission. In a system that uses a non-systematic code, the original message is transformed into an encoded message carrying the same information and that has at least as many bits as the original message.

The scheme is typically selected based on the characteristics of the communication channel. Common channel models include memory-less models where errors occur randomly and with a certain probability, and dynamic models where errors occur primarily in bursts. Some error-detecting and correcting codes are suitable for a mixture of random errors and burst errors.

In one example, error detection can be realized using a suitable hash function (or checksum algorithm). A hash function adds a fixed-length tag to a message, which enables receivers to verify the delivered message by re-computing the tag and comparing it with the one provided. There are several different hash function designs. One commonly used design is a cyclic redundancy check, which can be used in detecting burst errors.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
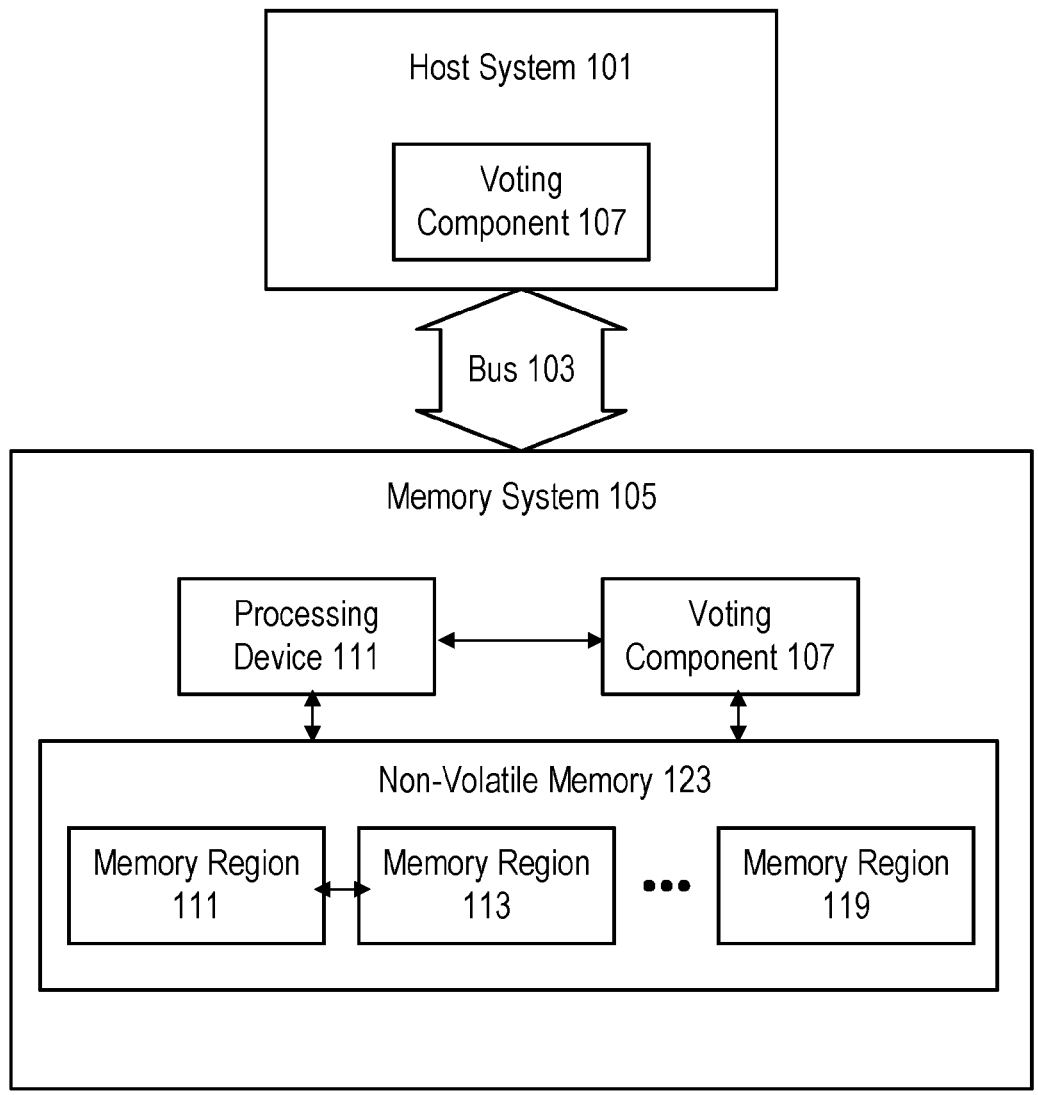
FIG. 1 illustrates an example computing system having a voting component, in accordance with some embodiments of the present disclosure.

At least some aspects of the present disclosure are directed to using a voting mechanism to access data stored in a non-volatile memory. In one example, the voting mechanism is a majority voter that is used to select data from one of multiple copies of the data stored in the non-volatile memory. In one example, data entries of stored code are read sequentially (e.g., each corresponding entry of code is read one-by-one from each of the multiple copies in parallel), and the voting mechanism is used to select an error-free data entry as each data entry is read. In one example, the data entries are read from boot code stored in a boot partition of a non-volatile memory. In other examples, the data entries can be read from other types of stored data (e.g., a file or set of files, or a partition storing other types of data).

In prior approaches, a non-volatile memory is used to store highly-sensitive data, for example, as computer software/code and applications that are read from the non-volatile memory and stored into volatile memory (e.g., RAM) of a host system. In one example, the data is read during a boot process of the host system. Such sensitive code is often stored in a special boot partition of the non-volatile memory.

Because of the sensitivity of the stored data, two or more copies of the identical code are stored along with a CRC checksum code that is used to detect data errors when reading the stored data. During boot time, a processing unit, for example, reads a first copy of the data from the boot partition, calculates its CRC checksum code, and compares the code to a code that is stored in the non-volatile memory. If there is a CRC match, then the read data is valid and the processing unit can start to execute the data code. However, if there is a CRC mismatch, the processing unit ignores the data and reads a second copy of the code from the boot partition, calculates the CRC, and determines if there is a CRC match. The processing unit repeats the foregoing CRC matching process with additional copies of the code if necessary.

It has been recognized that there are several technical problems associated with the above CRC matching process. For example, in a case of CRC mismatch, a long time is required to execute the boot process. For example, the entire boot code needs to be read again from a different copy. Reading the entire code again significantly increases the boot time of the host system. In another example, the processing power required by the processing unit and/or the host system is increased due to reading a larger volume of code. Further, the prior CRC matching process is complex due to having to re-read an entire code set, and the prior process can require significant software processing efforts for this reason.

At least some aspects of the present disclosure address the above and other technical problems by having, for example, a majority voter integrated inside a non-volatile memory (e.g., integrated onto the same chip or die as the storage media of the non-volatile memory). In one example, the majority voter can access in parallel multiple copies of boot code or other data that are stored in the non-volatile memory. For example, during a boot process, the majority voter reads the data in parallel from the various stored copies and generates an error-free (e.g., correct) data stream even if a data entry in one of the copies is corrupted. The majority voter can provide error-free data, for example, if the error rate between the copies of the data accessed in parallel for any given single entry does not exceed the correction power of the majority voter.

The use of the majority voter above provides a technological solution with several advantages. For example, use of the majority voter saves boot time in the case of corrupted boot partition or other stored data. For example, use of the majority voter simplifies the boot process task or other data reading task, reduces software efforts required to read correct data, and reduces processing power that is required by the processing unit during booting or other data access.

In one embodiment, a memory system receives a request to access data stored in a non-volatile memory. For example, the request is received from a processing device (e.g., CPU, GPU, FPGA, etc.) of a host system. In response to receiving the request, the memory system accesses data from multiple copies of the data stored in the non-volatile memory. A voting mechanism is used to match data from the copies with each other. In one example, the voting mechanism is a majority voter. In other embodiments, other types of voting mechanisms can be used to compare data from the copies with each other.

Based on matching the data from the copies with each other, the memory system selects data from one copy that has been determined to be error-free. The memory system provides the selected data as an output. In one example, the selected data is sent to the host system in response to a read command.

Various types of data can be stored in the copies. For example, the stored data can be associated with the operating system, software, software stacks, program variables, etc. Some of this stored data is generated by one or more software processes executing on one or more processing devices, or is collected by one or more sensors in a computing system. Some of the stored data corresponds to software (e.g., dynamic linked libraries) that is loaded into system memory and then used to execute the software processes.

In one example, the multiple copies are stored in memory regions of the non-volatile memory. Examples of memory regions that can store data include regions storing data such as boot code, software programs, operating systems, sensor data, control parameters generated by a machine learning model, graphics video buffers, camera input buffers, artificial graphics, deep learning calculations, etc.

Thus, in light of the above, various embodiments of the present disclosure provide a voting component that uses a voting mechanism (e.g., a majority voter) in combination with accessing multiple stored copies of data to select reliable and/or error-free data stored in a non-volatile memory. In one example, the selected data is provided as output data in response to a read request received from a host system.

The voting component of the present disclosure can be implemented in various computing systems. In one example system, a processing device (e.g., a system-on-chip (SOC), FPGA, CPU, or GPU) stores and/or accesses data stored in non-volatile memory device(s) (e.g., devices using NAND flash memory or cross point memory (such as 3DXP memory), or a SSD).

FIG. 1 illustrates an example computing system having a voting component 107, in accordance with some embodiments of the present disclosure. A host system 101 communicates over a bus 103 with a memory system 105. A processing device 111 of memory system 105 has read and write access to memory regions 111, 113, . . . , 119 of non-volatile memory 123. In one example, host system 101 reads data from and writes data to non-volatile memory 123.

In one example, the processing device 111 and the memory regions 111, 113, . . . , 119 are on the same chip or die. In some embodiments, the memory regions store data used by the host system 101 and/or the processing device 111 during machine learning processing and/or other data generated by software process(es) executing on host system 101 or on processing device 111.

The computing system includes a voting component 107 in the memory system 105 that uses a voting mechanism to select an error-free copy from multiple copies stored in one or more memory regions of the memory system 105. The computing system can further include a voting component 107 in the host system 120 that coordinates with the voting component 107 in the memory system 105 to at least facilitate read access to data stored in one or more memory regions.

In various embodiments, the voting component 107 selects one copy of the copies stored in one or more memory regions of non-volatile memory 123. For example, a voting mechanism can be used to select a copy from multiple copies for data requested in a read command received from host system 101.

In one embodiment, memory system 105 receives a request to access data stored in non-volatile memory 123. In response receiving the request, memory system 105 accesses data from multiple copies stored in one or more of the memory regions. A voting mechanism is used to match data from the copies with each other. In one example, the voting mechanism is a majority voter. Based on matching the data from the copies with each other, the voting mechanism selects data from one of the copies that is determined to be error-free. The memory system 105 provides the selected data in response to the request to access the data. In one example, the request to access the data is received over bus 103 from host system 101.

In some embodiments, non-volatile memory 123 is used to store data in response to a write command received over bus 123 from a processing device (not shown) of host system 101. In one embodiment, a process of host system 101 determines the memory regions used by the voting mechanism for selecting data.

In some embodiments, processing device 111 includes at least a portion of the voting component 107. In other embodiments, or in combination, the processing device 111 and/or a processing device in the host system 101 includes at least a portion of the voting component 107. For example, processing device 111 and/or a processing device of the host system 101 can include logic circuitry implementing certain portions of the voting component 107. For example, a controller or processing device (processor) of the host system 101 can be configured to execute instructions stored in memory for performing the operations of certain of the steps of the voting component 107 described herein.

In some embodiments, the voting component 107 is implemented in an integrated circuit chip disposed in the memory system 105. In other embodiments, portions of the voting component 107 in the host system 120 can be part of an operating system of the host system 120, a device driver, or an application.

An example of memory system 105 is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. In some embodiments, the memory system can be a hybrid memory/storage system that provides both memory functions and storage functions. In general, a host system can utilize a memory system that includes one or more memory regions. The host system can provide data to be stored at the memory system and can request data to be retrieved from the memory system. In one example, a host can access various types of memory, including volatile and non-volatile memory.

The host system 101 can be a computing device such as a controller in a vehicle, a network server, a mobile device, a cellular telephone, an embedded system (e.g., an embedded system having a system-on-chip (SOC) and internal or external memory), or any computing device that includes a memory and a processing device. The host system 101 can include or be coupled to the memory system 105 so that the host system 101 can read data from or write data to the memory system 105. The host system 101 can be coupled to the memory system 105 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 101 and the memory system 105. The physical host interface can provide an interface for passing control, address, data, and other signals between the memory system 105 and the host system 101. FIG. 1 illustrates a memory system 105 as an example. In general, the host system 101 can access multiple memory systems via a same communication connection, multiple separate communication connections, and/or a combination of communication connections.

The host system 101 can include a processing device and a controller (not shown). The processing device of the host system 101 can be, for example, a microprocessor, a central processing unit (CPU), a processing core of a processor, an execution unit, etc. In some instances, the controller of the host system can be referred to as a memory controller, a memory management unit, and/or an initiator. In one example, the controller controls the communications over bus 103 between the host system 101 and the memory system 105.

A controller of the host system 101 can communicate with a controller of the memory system 105 to perform operations such as reading data, writing data, or erasing data at the memory regions of non-volatile memory 123. In some instances, the controller is integrated within the same package of the processing device 111. In other instances, the controller is separate from the package of the processing device 111. The controller and/or the processing device can include hardware such as one or more integrated circuits and/or discrete components, a buffer memory, a cache memory, or a combination thereof. The controller and/or the processing device can be a microcontroller, special purpose logic circuitry (e.g., a field programmable gate array (FPGA), an application specific integrated circuit (ASIC), etc.), or another suitable processor.

In one embodiment, the memory regions 111, 113, . . . , 119 can include any combination of different types of non-volatile memory components. In some embodiments, the memory regions can be, but are not limited to, NAND flash memory or cross point memory. In some embodiments, the non-volatile memory can include read-only memory, flash memory, ferroelectric RAM, and computer storage devices (e.g. hard disk drives and solid state drives). Furthermore, the memory cells of the memory regions can be grouped as memory pages or data blocks that can refer to a unit used to store data. In some embodiments, the memory map can flag memory pages or data blocks.

In one embodiment using voting component 107, one or more controllers of the memory system 105 can communicate with the memory regions 111, 113, . . . , 119 to perform operations related to reading data. Each controller can include hardware such as one or more integrated circuits and/or discrete components, a buffer memory, or a combination thereof. Each controller can be a microcontroller, special purpose logic circuitry (e.g., a field programmable gate array (FPGA), an application specific integrated circuit (ASIC), etc.), or another suitable processor. The controller(s) can include a processing device (processor) configured to execute instructions stored in local memory. In one example, local memory of the controller includes an embedded memory configured to store instructions for performing various processes, operations, logic flows, and routines that control operation of the memory system 105, including handling communications between the memory system 105 and the host system 101. In some embodiments, the local memory can include memory registers storing memory pointers, fetched data, etc. The local memory can also include read-only memory (ROM) for storing micro-code.

In general, controller(s) of memory system 105 can receive commands or operations from the host system 101 and/or processing device 111 and can convert the commands or operations into instructions or appropriate commands to achieve the data transfer for the identified memory regions. The controller can also be responsible for other operations such as wear leveling operations, garbage collection operations, error detection and error-correcting code (ECC) operations, encryption operations, caching operations, and address translations between a logical block address and a physical block address that are associated with the memory regions. The controller can further include host interface circuitry to communicate with the host system 101 via the physical host interface. The host interface circuitry can convert the commands received from the host system into command instructions to access one or more of the memory regions as well as convert responses associated with the memory regions into information for the host system 101.

The memory system 105 can also include additional circuitry or components that are not illustrated. In some embodiments, the memory system 105 can include a cache or buffer (e.g., DRAM or SRAM) and address circuitry (e.g., a row decoder and a column decoder) that can receive an address from one or more controllers and decode the address to access the memory regions.

In some embodiments, a controller in the host system 101 or memory system 105, and/or the processing device 111 includes at least a portion of the voting component 107. For example, the controller and/or the processing device 111 can include logic circuitry implementing portions of the voting component 107. For example, a processing device (processor) can be configured to execute instructions stored in memory for performing operations that provide read/write access to memory regions for the voting component 107 as described herein. In some embodiments, the voting component 107 is part of an operating system, a device driver, or an application.

Figure 2:
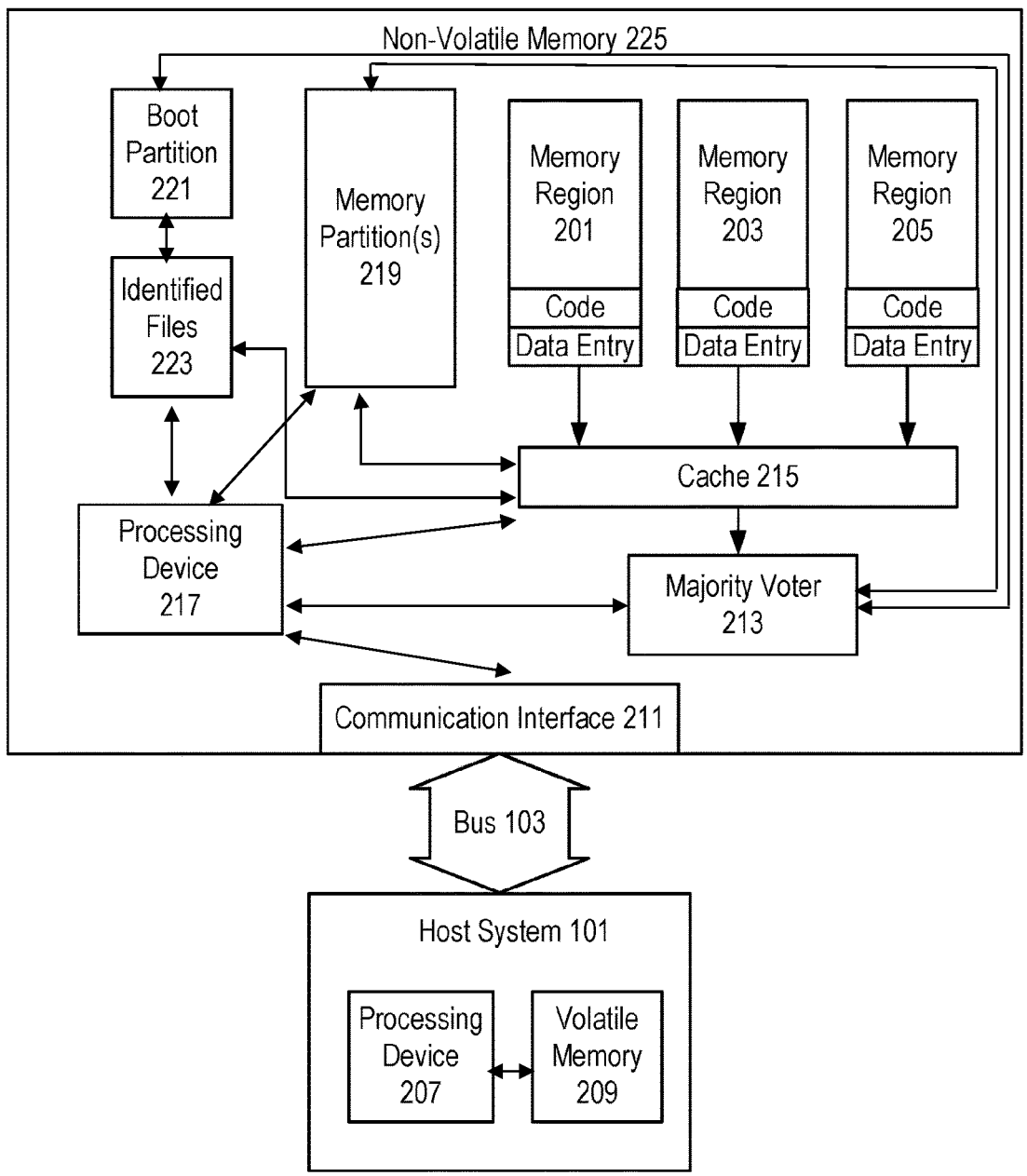
FIG. 2 illustrates an example memory system that uses a majority voter to access data stored in a non-volatile memory, in accordance with some embodiments of the present disclosure.

FIG. 2 illustrates an example memory system that uses a majority voter 213 to access data stored in a non-volatile memory 225, in accordance with some embodiments of the present disclosure. For example, copies stored in one or more of memory regions 201, 203, 205 of non-volatile memory 225 can be accessed by majority voter 213. The voting mechanism (here, for example, including majority voter 213) is controlled by processing device 217.

In one example, processing device 217 receives read and write commands from host system 101 over bus 103. The read command can be sent, for example, by processing device 207 of the host system 101. In response to the read command, the majority voter 213 selects data for providing as output data. The selected data is provided to bus 103 by communication interface 211. The selected data is copied by processing device 207 into volatile memory 209 of host system 101. In one example, volatile memory 209 is dynamic random-access memory (DRAM). In one example, volatile memory 209 is system memory for processing device 207.

In one embodiment, the data accessed by majority voter 213 is loaded into cache 215 from each of the memory regions. In one embodiment, a data entry is loaded from each of memory regions 201, 203, and 205. In some cases, the data entry is accompanied by a code. In one example, the code is a hash of the data entry.

In one embodiment, the majority voter 213 compares each data entry to one another. If all three entries match, the majority voter 213 selects one of the data entries to provide as output data. If only two of the entries match, then the majority voter 213 selects one of the matching entries to provide as output data. If none of the entries match, then the majority voter 213 provides a signal to processing device 217 indicating that there is a data read failure or other error, and/or the majority voter 213 can initiate other corrective action (e.g., initiating a memory test of one or more memory regions).

In one embodiment, the majority voter 213 is implemented using logic circuitry. For example, the majority voter 213 can be implemented using logic gates. In other embodiments, the majority voter 213 can be implemented using processing device 217. In some cases, the majority voter 213 can be implemented using both logic circuitry and software.

In other embodiments, majority voter 213 can use a number of inputs that is greater than three. For example, the number of inputs can be an odd integer having a value of five or greater (e.g., 5, 7, 9, . . . ) (more generally, e.g., 2n+1, wherein n=1, 2, 3, . . . ). In one example, the majority voter 213 selects a data entry from a copy that matches a majority of a total number of data entries from the copies.

In some embodiments, host system 101 makes requests for access to data stored in a boot partition 221. In this case, multiple copies are loaded from boot partition 221 into cache 215 for selection of error-free data (e.g., a set of sequential data entries).

In other embodiments, the request for access is for data stored in one or more identified files 223. In this case, multiple copies are loaded from the one or more identified files 223 into cache 215.

In some embodiments, processing device 217 and/or processing device 207 identify one or more memory partitions 219 for which majority voter 213 will be used for servicing read requests received for data stored in one or more of the memory partitions 219. In this case, the multiple copies are loaded from the memory partition(s) 219 into cache 215.

In some embodiments, processing device 217 can configure the majority voter 213 to vary the number of copies loaded into cache 215 and used during the matching process. For example, data from boot partition 221 can be selected using a five-input majority voter 213, while data from identified files 223 and/or a memory partition 219 can be selected using a three-input majority voter 213.

In alternative embodiments, another form of voting mechanism instead of majority voter 213 can be used. For example, a voting mechanism can be used that determines that a threshold number of data entries from the multiple copies loaded into cache 215 match each other. One of these matching copies can be selected as output data. In some cases, a matching copy is selected based on achieving the threshold number of matches even if less than a majority of copies match one another.

In one embodiment, a read command is received from host system 101. The read command is associated with a logical address. Processing device 217 determines physical addresses within memory regions 201, 203, 205 that correspond to the logical address. Data entries from multiple copies at these physical addresses are sequentially loaded into cache 215 as entries are sequentially read from non-volatile memory 225 and provided to host system 101.

In one embodiment, data portions can be read from each of the memory regions. In one example, the data portions correspond to blocks or pages of data.

In one embodiment, each data entry or data portion loaded from the multiple copies of data is associated with a code. Processing device 217 and/or majority voter 213 can execute a process to determine an evaluation result for each loaded data entry or data portion. In one embodiment, the evaluation result is a hash that is compared to the code associated with the respective data entry or data portion. In one embodiment, matching data from the multiple copies can be based at least in part on the evaluation result that is determined. For example, if a hash of a data entry or data portion does not match the code, then the data entry or data portion can be deemed to be erroneous and thus not considered to match other copies.

In another embodiment, an evaluation result for a data entry from a first copy can be compared to an evaluation result for a data entry from a second copy. The evaluation results can be compared as part of determining whether there is a match of the data between the copies.

In one example, volatile memory 209 includes DRAM and/or SRAM. In one example, processing device 217 is a state machine that receives read commands (e.g., read commands to read a block or page of data).

In one embodiment, data transfer by processing device 217 is initiated by a signal sent by processing device 207 to processing device 217. The signal can be sent in response to various events as determined by processing device 207. For example, a machine learning model can provide a result to processing device 207. The signal can be sent in response to the result.

In one embodiment, the machine learning model receives inputs based on data received from various computing systems. In one example, the data is sensor data received from vehicle systems of an autonomous vehicle.

In one embodiment, the machine learning model monitors data associated with a power source. An output from machine learning model can be used by processing device 207 as a basis for initiating data transfer (e.g., responding to a read command) by processing device 217 and/or managing the allocation of power to processing devices from the power source (e.g., allocation in real-time during the data transfer process).

Non-volatile memory 225 is an example of non-volatile memory 123. In one example, non-volatile memory 225 is flash memory and/or a solid-state drive (SSD).

In one embodiment, system memory used by processing device 207 resides in volatile memory 209. Processing device 207 can initiate a data transfer process in response to various events (e.g., a detection of a loss of power to a memory or other component of the computing system).

In one embodiment, a host system (e.g., host system 101) can collect data from sensors of an embedded system. For example, the sensors can be located on an autonomous vehicle and collect image data used for navigation of the vehicle. In one embodiment, the sensor data is input to the machine learning model (e.g., a neural network) and an output is used to control the vehicle. In one embodiment, the processing associated with a neural network is performed by processing device 207, either alone or in conjunction with a processing device of the host system.

In one embodiment, a neural network is trained or operated using processing device 207. During training or other operation of the neural network, data is read from and written to volatile memory 209 and/or non-volatile memory 225.

In one embodiment, the processing device 217 and the non-volatile memory 225 are disposed on the same chip or die, and the processing device 207 uses stored data from non-volatile memory 225 and/or volatile memory 209 as an input to a computer model for machine learning. In one embodiment, the computer model is a neural network. In one embodiment, the processing device 207 provides data as an output from the computer model.

In one embodiment, controller(s) used to access non-volatile memory 225 can include hardware such as one or more integrated circuits and/or discrete components, a buffer memory, or a combination thereof. The controller can be a microcontroller, special purpose logic circuitry (e.g., a field programmable gate array (FPGA), an application specific integrated circuit (ASIC), etc.), or another suitable processor. The controller can include one or more processors (processing devices) configured to execute instructions stored in local memory.

Local memory of the controller can include an embedded memory configured to store instructions for performing various processes, operations, logic flows, and routines that control aspects of operation for the memory system. Local memory of the controller can include read-only memory (ROM) for storing micro-code and/or memory registers storing, for example, memory pointers, fetched data, etc.

Figure 3:
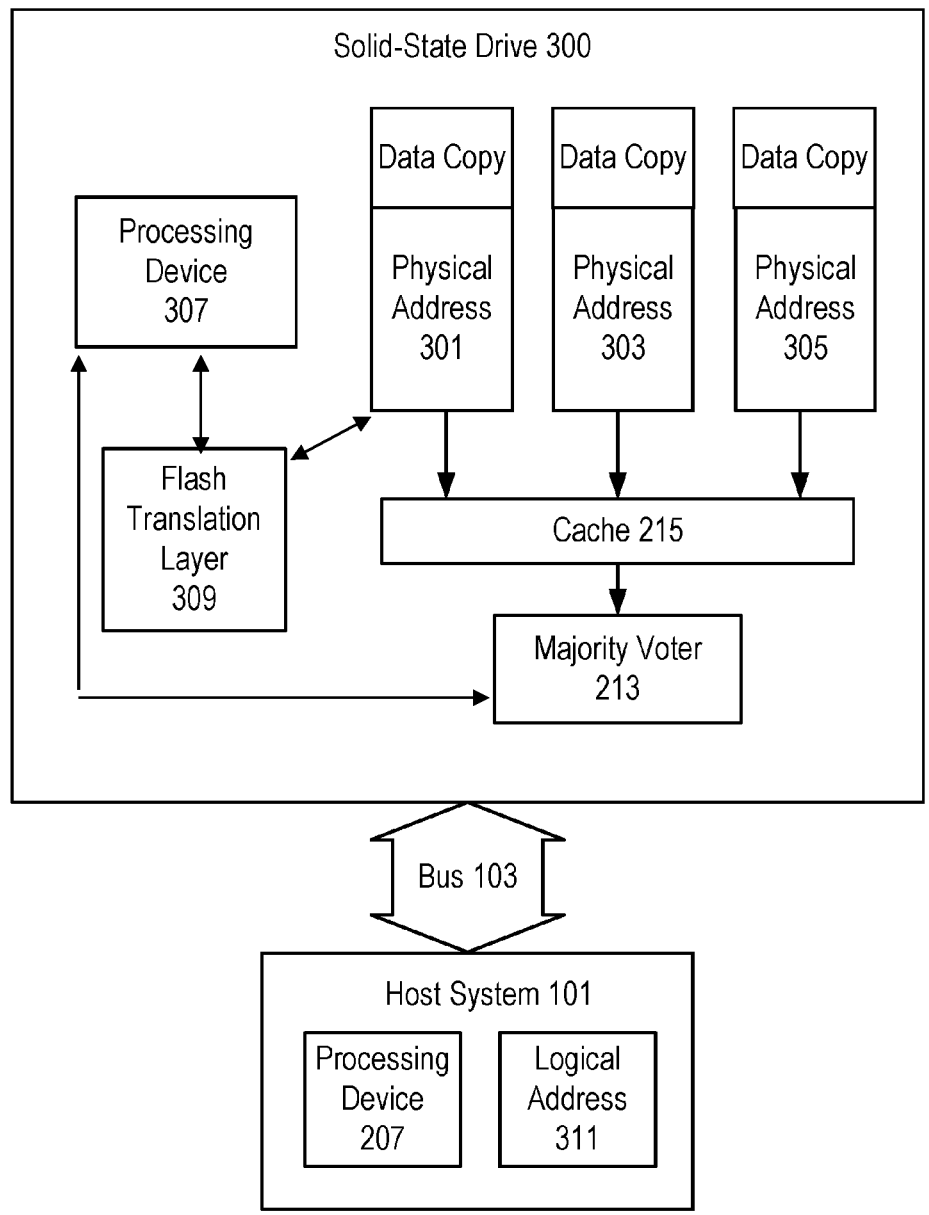
FIG. 3 illustrates an example solid-state drive that uses a majority voter for responding to read commands received from a host system, in accordance with some embodiments of the present disclosure.

FIG. 3 illustrates an example solid-state drive 300 that uses majority voter 213 for responding to read commands received from host system 101, in accordance with some embodiments of the present disclosure. Solid-state drive 300 is an example of non-volatile memory 123 or non-volatile memory 225.

In one embodiment, multiple copies of data are stored at physical addresses 301, 303, and 305. Processing device 307 receives a read command from host system 101. The read command is sent by processing device 207 and includes one or more logical addresses 311 corresponding to data that the host system 101 desires to access. Processing device 307 evaluates the logical address 311 and determines that the desired data corresponds to physical addresses 301, 303, and 305.

A data copy from each of the physical addresses 301, 303, and 305 is loaded into cache 215. Matching of the data copies is performed by majority voter 213, for example, similarly as described above.

In one embodiment, solid-state drive 300 includes a flash translation layer 309. The flash translation layer maps logical address 311 received from host system 101 to physical addresses 301, 303, and 305, which correspond to multiple identical copies of the data requested by the host system 101 in the read command.

In one embodiment, the flash translation layer 309 maps the logical address 311 to 2n+1 of physical addresses in solid-state drive 300, where n is an integer equal to one or greater, and where the physical addresses correspond to storage locations of the multiple copies in memory regions of the solid-state drive 300. In other embodiments, flash translation layer 309 can be used with non-volatile memory 225.

In one embodiment, flash translation layer 309 can be configured in real-time by processing device 307. For example, processing device 307 can configure flash translation layer 309 to map the logical address to a varying number of multiple copies and/or varying number of physical addresses for each read request received from host system 102, or for each type of read request received from the system 102. For example, for a first read request, 5 copies may be accessed in parallel. For a second read request, 3 copies may be accessed in parallel.

In one embodiment, processing device 207 of host system 101 monitors various types of data collected from sensors and one or more computing systems. Based on monitoring this collected data, processing device 207 can determine that an event has occurred and in response to this determination, send a read command to solid-state drive 300. For example, the event can be associated with the operation of one or more of computing systems. In one example, sensors include one or more accelerometers of an autonomous vehicle. In response to determining that an event has occurred, processing device 207 initiates reading of data by sending a signal over bus 103 to processing device 307.

Figure 4:
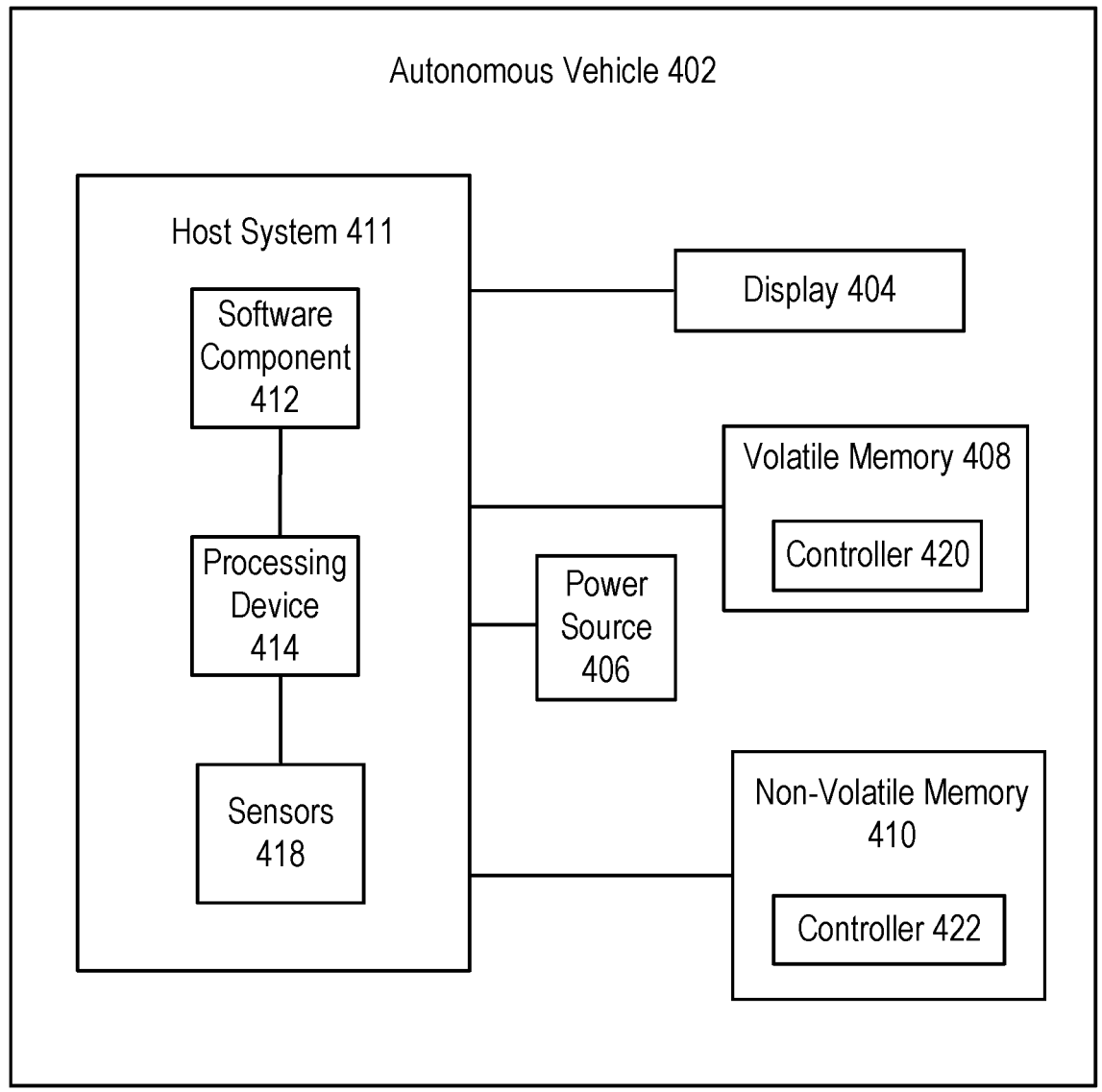
FIG. 4 illustrates an example autonomous vehicle having a host system that accesses data stored in a non-volatile memory, in accordance with some embodiments of the present disclosure.

FIG. 4 illustrates an example autonomous vehicle 402 having a host system 411 that accesses data stored in a non-volatile memory 410, in accordance with some embodiments of the present disclosure. Host system 411 is an example of host system 101. Non-volatile memory 410 is an example of non-volatile memory 225 or solid-state drive 300.

In one embodiment, host system 411 monitors collected data and initiates a data transfer process based on the monitoring, in accordance with some embodiments of the present disclosure. For example, the data transfer process is reading of data from non-volatile memory 410.

In one embodiment, the collected data is generated or collected by a software component 412 and/or is sensor data received from sensors 418. Autonomous vehicle 402 is, for example, a car, truck, boat, plane, helicopter, or unmanned aerial vehicle (e.g., a drone).

In one embodiment, non-volatile memory 410 stores data generated by software component 412 of host system 411 prior to initiating the data transfer.

In one embodiment, during the data transfer process, data is copied from non-volatile memory 410 to volatile memory 408.

In one embodiment, processing device 414 initiates the data transfer process. In order to initiate the data transfer process, processing device 414 sends a signal to controller 422. In response to receiving the signal, controller 422 handles providing of some or all data in one or more memory regions from non-volatile memory 410 to volatile memory 408. Processing device 414 may send data to controller 422 that indicates memory regions from which to access multiple copies in parallel and/or provide data that is evaluated by controller 422 to determine memory regions from which to access multiple copies in parallel.

In one embodiment, host system 402 provides data for displaying graphical images on display 404 for a user of autonomous vehicle 402. Memory regions of volatile memory 408 can store data corresponding to the presented display.

In one embodiment, a power source 406 is used to provide power to volatile memory 408. Host system 411 is configured to detect an impending loss of power from power source 406. In response to detecting the impending loss of power, host system 411 can initiate a data transfer process.

In one embodiment, a controller 420 is an internal controller of volatile memory 408, and controller 422 is an internal controller of non-volatile memory 410. In one embodiment, host system 411 and/or controller 422 are powered by power source 406.

Figure 5:
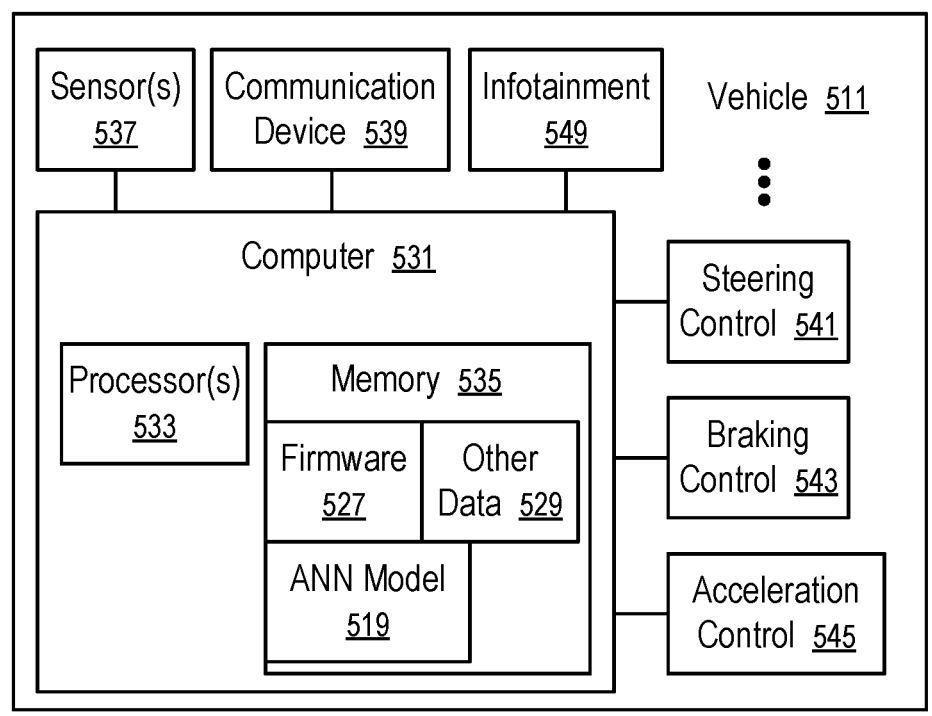
FIG. 5 illustrates an example of a vehicle configured using an artificial neural network (ANN) model, according to one embodiment.

FIG. 5 illustrates an example of a vehicle 511 configured using an artificial neural network (ANN) model 519, according to one embodiment. ANN model 519 is an example of a machine learning model. Vehicle 511 is an example of autonomous vehicle 402.

The vehicle 511 includes an infotainment system 549, a communication device 539, one or more sensors 537, and a computer 531 that is connected to some controls of the vehicle 511, such as a steering control 541 for the direction of the vehicle 511, a braking control 543 for stopping of the vehicle 511, an acceleration control 545 for the speed of the vehicle 511, etc.

The computer 531 of the vehicle 511 includes one or more processors 533, memory 535 storing firmware (or software) 527, the ANN model 519, and other data 529. Computer 531 is an example of host system 101.

In one example, firmware 527 is updated by an over-the-air update in response to a communication from another host system (e.g., server) sent in response to identifying faulty software. Alternatively, and/or additionally, other firmware of various computing devices or systems of vehicle 511 can be updated.

The one or more sensors 537 may include a visible light camera, an infrared camera, a LIDAR, RADAR, or sonar system, and/or peripheral sensors, which are configured to provide sensor input to the computer 531. A module of the firmware (or software) 527 executed in the processor(s) 533 applies the sensor input to an ANN defined by the model 519 to generate an output that identifies or classifies an event or object captured in the sensor input, such as an image or video clip. Data from this identification and/or classification can be included in data collected by a memory device and sent from a vehicle to the server.

Alternatively, and/or additionally, identification of unsafe software can be used by an autonomous driving module of the firmware (or software) 527 to generate a response. The response may be a command to activate and/or adjust one of the vehicle controls 541, 543, and 545. In one embodiment, the response is an action performed by the vehicle where the action has been configured based on an update command from the server (e.g., the update command can be generated by the server in response to determining that software of vehicle 511 is faulty based on analysis of event data). In one embodiment, prior to generating the control response, the vehicle is configured. In one embodiment, the configuration of the vehicle is performed by updating firmware of vehicle 511. In one embodiment, the configuration of the vehicle includes updating of the computer model stored in vehicle 511 (e.g., ANN model 519).

In one embodiment, the server stores received sensor input as part of sensor data for further training or updating of the ANN model 519 using an supervised training module. When an updated version of the ANN model 519 is available in the server, the vehicle 511 may use the communication device 539 to download the updated ANN model 519 for installation in the memory 535 and/or for the replacement of the previously installed ANN model 519. These actions may be performed in response to determining that vehicle 511 is failing to properly detect objects and/or in response to identifying unsafe software.

In one example, the outputs of the ANN model 519 can be used to control (e.g., 541, 543, 545) the acceleration of a vehicle (e.g., 511), the speed of the vehicle 511, and/or the direction of the vehicle 511, during autonomous driving.

In one example, data obtained from a sensor of a vehicle may be an image that captures an object using a camera that images using lights visible to human eyes, or a camera that images using infrared lights, or a sonar, radar, or LIDAR system. In one embodiment, image data obtained from at least one sensor of the vehicle is part of the collected data from the vehicle that is analyzed. In some instances, the ANN model is configured for a particular vehicle based on the sensor and other collected data.

Memory 535 is an example of memory system 105. In one example, the data obtained from one or more sensors of the vehicle can be stored in volatile memory 408 or non-volatile memory 410.

In one embodiment, processor 533 sends a read command to memory 535. In one example, processor 533 desires to reliably read firmware 527 and/or other data 529 from non-volatile memory using voting component 107 as described above.

Figure 6:
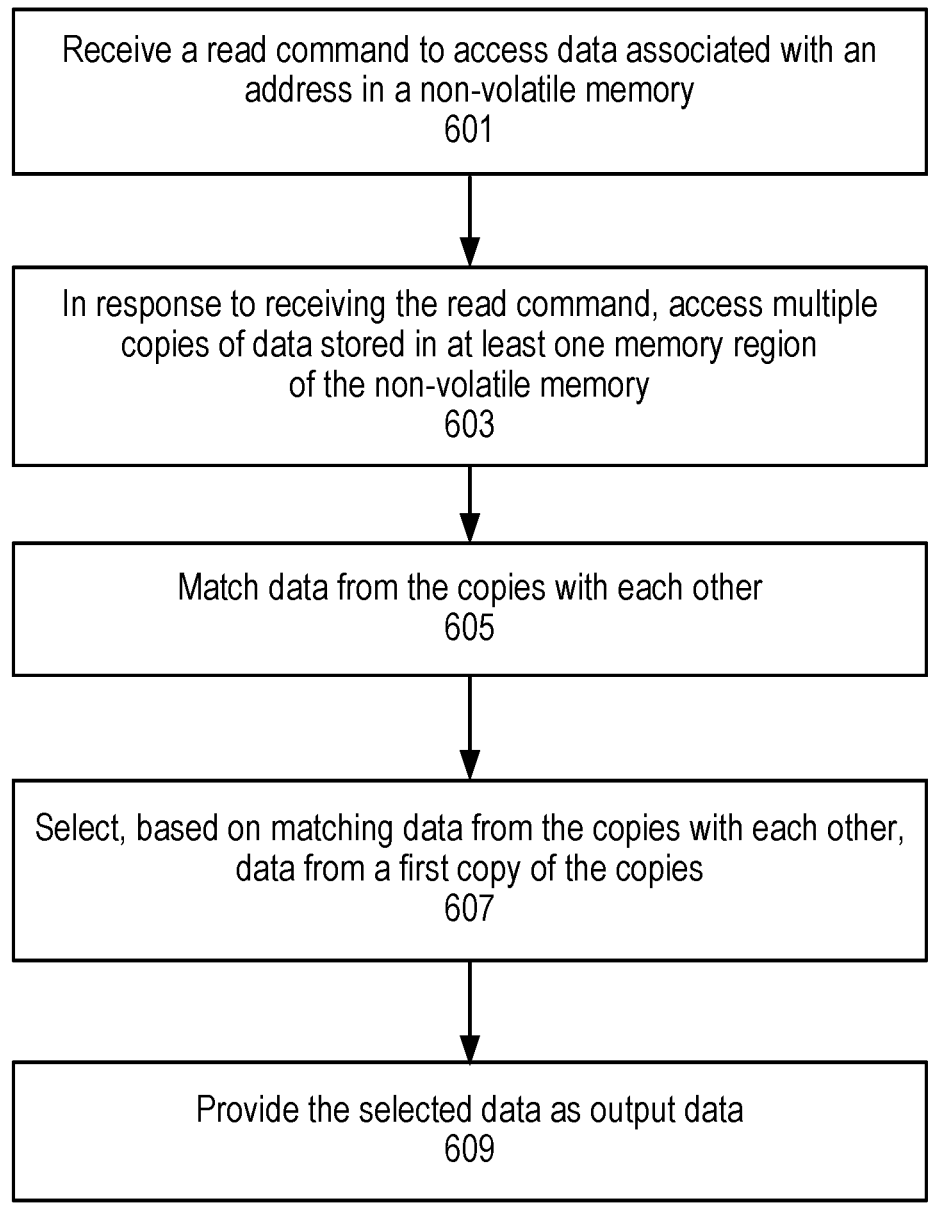
FIG. 6 is a flow diagram of an example method of reading reliable data from a non-volatile memory by matching copies of stored data, in accordance with some embodiments of the present disclosure.

FIG. 6 is a flow diagram of an example method of reading reliable (e.g., error-free) data from a non-volatile memory by matching copies of stored data, in accordance with some embodiments of the present disclosure. For example, the method of FIG. 6 can be implemented in the system of FIGS. 1-5.

The method of FIG. 6 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 6 is performed at least in part by the voting component 107 of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 601, a read command to access data associated with an address in a non-volatile memory is received. For example, a read command is received from host system 101 to access data stored in non-volatile memory 225. In one example, the address is logical address 311.

At block 603, in response to receiving the read command, multiple copies of data stored in at least one memory region of the non-volatile memory are accessed. For example, data entries in memory regions 201, 203, and 205 are accessed by majority voter 213.

At block 605, data from each of the copies is matched with each other. For example, each of the data entries is loaded into cache 215. Majority voter 213 compares the data entries to one another to determine which of the data entries match one another.

At block 607, data from one of the copies is selected. The data is selected based on matching data from the copies with each other. For example, the data entry from memory region 201 is selected for providing as output data to host system 101. This data entry is selected based on the data entry matching the majority of the data entries loaded into cache 215, as determined by majority voter 213.

At block 609, the selected data is provided as output data. For example, the matching data entry selected by the majority voter 213 is provided as output data and sent over bus 103 to host system 101. The output data is stored in volatile memory 209 under control of processing device 207.

In one aspect, the present disclosure includes computing apparatuses performing any of the methods and non-transitory computer-readable storage media storing instructions that, when executed by a processing device, cause the processing device to perform any of the methods.

In one embodiment, a method for a non-volatile memory (e.g., non-volatile memory 123 or 225) comprises: receiving, from a host system over a bus, a read command to access data associated with an address in the non-volatile memory; in response to receiving the read command, accessing, by a processing device, multiple copies of data stored in at least one memory region (e.g., 201, 203, 205) of the non-volatile memory; matching, by the processing device, data from the copies with each other; selecting, based on matching data from the copies with each other, first data from a first copy of the copies; and providing, to the host system over the bus, the first data as output data.

In one embodiment, matching data from the copies with each other comprises matching each of a sequential series of corresponding entries read in parallel from each of the copies for responding to the read command.

In one embodiment, the data associated with an address in the non-volatile memory is boot code stored in a boot partition of the non-volatile memory.

In one embodiment, a threshold number of data entries from the copies, including a data entry from the first copy, match each other.

In one embodiment, a total number of copies is accessed, and the threshold number is a majority of the total number.

In one embodiment, the method further comprises evaluating, by the processing device, data from each copy to provide a respective evaluation result.

In one embodiment, matching data from the copies with each other comprises comparing a first evaluation result for data from the first copy to a second evaluation result for data from a second copy of the copies.

In one embodiment, the respective evaluation result is a hash.

In one embodiment, the method further comprises comparing each respective evaluation result to an error-detecting code associated with the respective copy (e.g., the code stored in memory region 201 as associated with the data entry in memory region 201).

In one embodiment, matching data from the copies with each other comprises using a bitwise operation that compares data from the first copy to data from a second copy of the copies.

In one embodiment, a system comprises: non-volatile memory; a processing device; and memory storing instructions configured to instruct the processing device to: receive a request to access data; in response to receiving the request, access data from multiple copies stored in the non-volatile memory; match data from the copies with each other; select, based on matching the data from the copies with each other, first data associated with a first copy of the copies; and provide the first data as an output from the non-volatile memory.

In one embodiment, the system further comprises a cache (e.g., cache 215) and a majority voter (e.g., majority voter 213), wherein data from the multiple copies is loaded into the cache in response to receiving the request, and wherein matching data from the copies with each other comprises reading, by the majority voter, the data from the multiple copies in the cache to perform an evaluation of the multiple copies.

In one embodiment, the request to access data is received from a host system (e.g., host system 101), wherein providing the first data comprises sending the first data to the host system, and wherein the host system is configured to store the first data in a volatile memory (e.g., volatile memory 209) of the host system.

In one embodiment, each of the copies comprises a plurality of data portions (e.g., a data entry in memory region 201), and accessing data from the multiple copies comprises reading, in parallel, a corresponding first portion from each of the copies.

In one embodiment, the request to access data includes a logical address (e.g., logical address 311), and each corresponding first portion is stored in the non-volatile memory (e.g., non-volatile memory 225) at a respective physical address that corresponds to the logical address.

In one embodiment, matching data from the copies with each other comprises matching each of a sequential series of corresponding entries read in parallel from each of the copies.

In one embodiment, the data stored in the non-volatile memory is an identified partition of the non-volatile memory, or is a set of files stored in the non-volatile memory.

In one embodiment, the non-volatile memory is a solid-state drive (e.g., solid-state drive 300), and the system further comprises a flash translation layer, wherein the flash translation layer maps a logical address received from a host system to physical addresses associated with the multiple copies.

In one embodiment, the flash translation layer further maps the logical address to 2n+1 of the physical addresses, wherein n is an integer equal to one or greater, and wherein the physical addresses correspond to storage locations of the multiple copies in at least one memory region of the non-volatile memory.

In one embodiment, a non-transitory computer-readable storage medium stores instructions that, when executed by at least one processing device, cause the at least one processing device to perform a method, the method comprising: receiving a request to access data in a non-volatile memory; in response to receiving the request, accessing data from multiple copies stored in the non-volatile memory; matching data from the copies with each other; selecting, based on matching the data from the copies with each other, first data from a first copy of the copies; and providing the first data as an output from the non-volatile memory.

In one embodiment, the majority voter is not limited to use when reading boot data. Instead, the majority voter can be used to protect a particular partition or a particular set of files. A controller can be built with such capability for selected data that needs extra protection. Thus, the protection can be initiated on demand (instead of having to be set up at a time of partitioning a storage device).

In one embodiment, an SSD has a flash translation layer that maps a logic block address received from a host/CPU to a physical address in the SSD. The flash translation layer can be configured to map a logic block address to 2n+1 physical addresses and thus enable use of a majority voter any time the host/CPU may desire.

Figure 7:
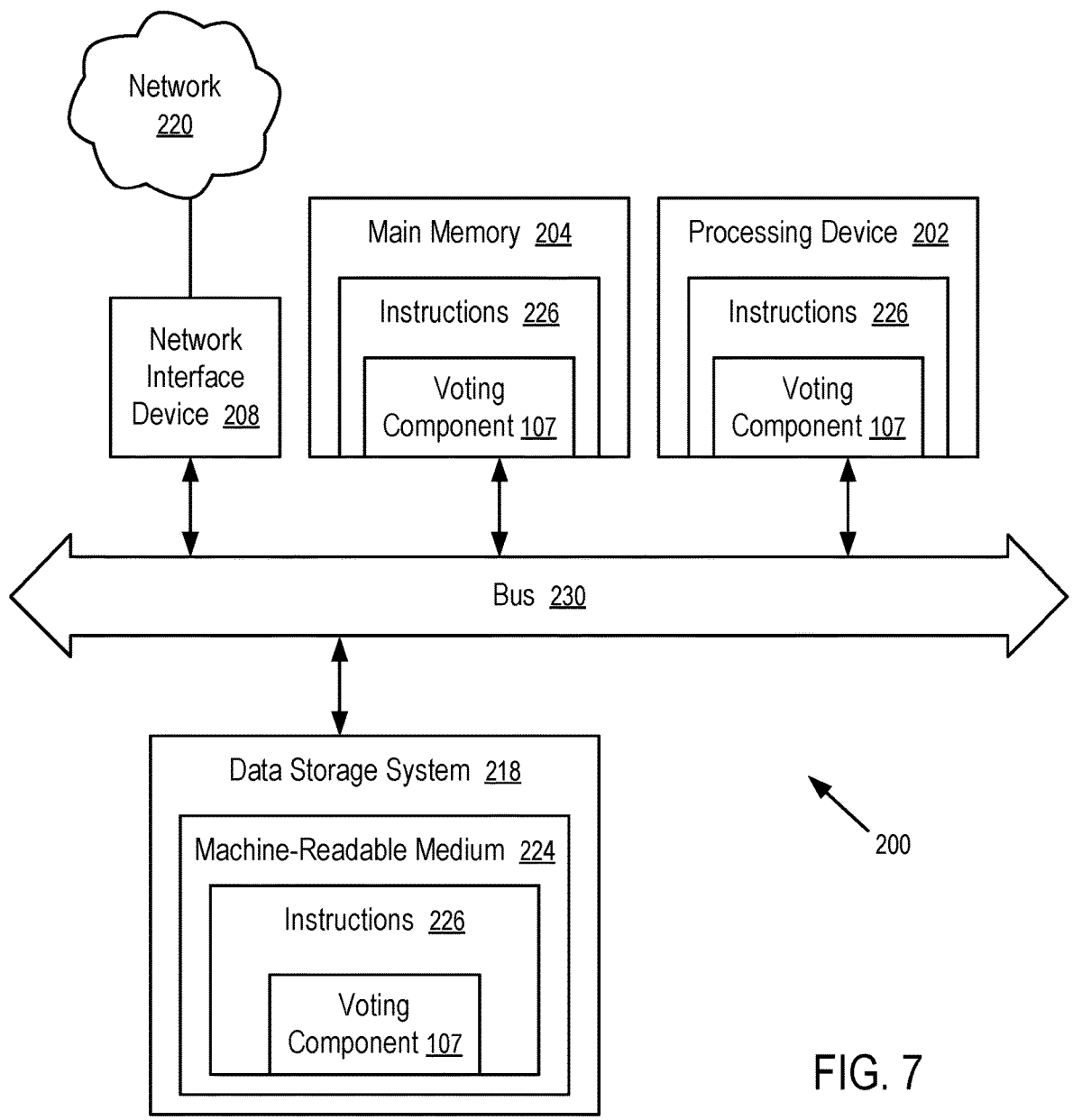
FIG. 7 is a block diagram of an example computer system in which embodiments of the present disclosure can operate.

FIG. 7 is a block diagram of an example computer system 200 in which embodiments of the present disclosure can operate. In one embodiment, in computer system 200 a set of instructions, for causing a machine to perform any one or more of the methodologies discussed herein, can be executed. In some embodiments, the computer system 200 can correspond to a memory system, or to a host system that includes, is coupled to, or utilizes a memory system (e.g., the memory system 105 of FIG. 1) or can be used to perform the operations of a voting component 107 (e.g., to execute instructions to perform operations corresponding to the voting component 107 described with reference to FIGS. 1-6). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 200 includes a processing device 202, a main memory 204 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 218, which communicate with each other via a bus 230 (which can include multiple buses).

Processing device 202 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 202 can also be one or more special-purpose processing devices such as an application specific integrated circuit (ASIC), a field programmable gate array (FPGA), a digital signal processor (DSP), network processor, or the like. The processing device 202 is configured to execute instructions 226 for performing the operations and steps discussed herein. The computer system 200 can further include a network interface device 208 to communicate over the network 220.

The data storage system 218 can include a machine-readable storage medium 224 (also known as a computer-readable medium) on which is stored one or more sets of instructions 226 or software embodying any one or more of the methodologies or functions described herein. The instructions 226 can also reside, completely or at least partially, within the main memory 204 and/or within the processing device 202 during execution thereof by the computer system 200, the main memory 204 and the processing device 202 also constituting machine-readable storage media. The machine-readable storage medium 224, data storage system 218, and/or main memory 204 can correspond to the memory system 105 of FIG. 1.

In one embodiment, the instructions 226 include instructions to implement functionality corresponding to a voting component 107 (e.g., the voting component 107 described with reference to FIGS. 1-6). While the machine-readable storage medium 224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a communication interface configured to receive a request containing a logic address from a host system, and provide an output code with multiple data bits from the logic address to the host system in response to the request;
   a non-volatile memory configured to store three or more copies of the code;
   a flash translation layer mapping the logic address to three or more physical addresses; and
   a majority voter configured to, in response to receiving the request, access the three or more copies of the code at the three or more physical addresses, respectively, in parallel, and select one of the copies as the output code based on the one of the copies matching at least one other copy of the copies of the code.

2. The system of claim 1, further comprising a cache configured to receive the copies of the code accessed by the majority voter.

3. The system of claim 2, wherein the majority voter is further configured to read data from the copies in the cache to perform an evaluation of the copies to select the one of the copies as the output code.

4. The system of claim 1, wherein the majority voter selects the one of the copies based on matching code from the copies with each other.

5. The system of claim 4, wherein the request is a read command.

6. The system of claim 1, further comprising a boot partition, wherein the request from the host system is a request for data stored in the boot partition.

7. The system of claim 1, wherein the majority voter is further configured to vary a number of the copies accessed.

8. The system of claim 7, wherein the number of copies accessed is determined based on at least one memory region of the non-volatile memory from which the copies are accessed.

9. The system of claim 1, wherein each of the copies is associated with a code stored in the non-volatile memory.

10. The system of claim 9, wherein the majority voter is further configured to select the one of the copies as the output code by comparing a hash of each of the copies to its respective code.

11. The system of claim 1, wherein the communication interface is further configured to receive data from the host system that indicates at least one memory region of the non-volatile memory from which to access the copies.

12. The system of claim 1, wherein the host system sends the request in response to detecting an impending loss of power from a power source.

13. A method comprising:
   receiving a request containing a logic address from a host system for a code with multiple data bits stored in a memory;
   mapping the logic address to three or more physical addresses in the memory;
   in response to receiving the request, accessing three or more copies of the code at the three or more physical addresses, respectively, in parallel in the memory;
   performing, by a majority voter of the memory, an evaluation of the accessed copies;
   selecting, based on the evaluation, one of the copies as an output code, wherein the one of the copies is selected based on the one of the copies matching at least one other copy of the copies of the code; and
   providing the output code to the host system.

14. The method of claim 13, wherein performing the evaluation comprises matching code from the copies with each other.

15. The method of claim 14, wherein matching code from the copies with each other comprises matching each of a series of corresponding entries read from each of the copies.

16. The method of claim 13, wherein each of the copies of the code is stored in a different memory region of the memory.

17. The method of claim 13, wherein the majority voter determines that a majority of a total number of the accessed copies match each other.

18. The method of claim 13, wherein the mapping is performed by a flash translation layer of the memory.

19. A non-transitory computer-readable storage medium storing instructions that, when executed by at least one processing device, cause the at least one processing device to perform a method, the method comprising:
- receiving a request for a code with multiple data bits stored in a memory, the request containing a logic address for the code;
- mapping the logic address to three or more physical addresses of the memory by a flash translation layer;
- in response to receiving the request, accessing three or more copies of the code at the three or more physical addresses, respectively, in parallel in the memory;
- performing, by a majority voter, an evaluation of the accessed copies;
- selecting, based on the evaluation, one of the copies as output code, wherein the one of the copies is selected based on the one of the copies matching at least one other copy of the copies of the code; and
- providing the output code as a reply to the request.

* * * * *